Nov. 16, 1965   R. E. HERMAN   3,218,090
UTILITY CART

Filed Sept. 20, 1963   2 Sheets-Sheet 1

INVENTOR.
RALPH E. HERMAN
BY
McMorrow, Berman & Davidson
ATTORNEYS

Nov. 16, 1965        R. E. HERMAN              3,218,090
                     UTILITY CART
Filed Sept. 20, 1963                    2 Sheets-Sheet 2
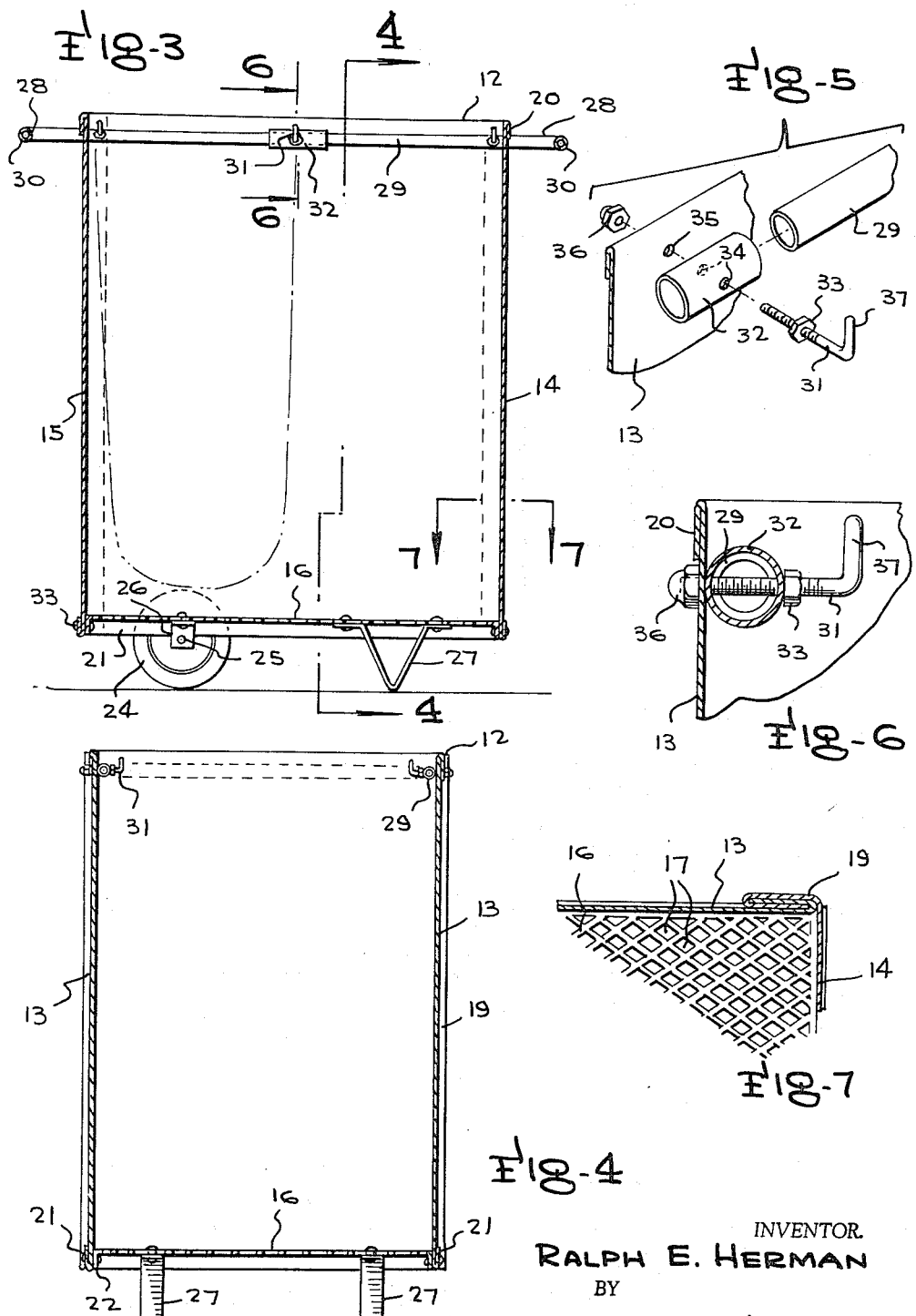
INVENTOR.
RALPH E. HERMAN
BY
McMorrow, Berman & Davidson
ATTORNEYS

United States Patent Office 3,218,090
Patented Nov. 16, 1965

3,218,090
UTILITY CART
Ralph E. Herman, 334 Dupps, Pueblo, Colo.
Filed Sept. 20, 1963, Ser. No. 310,323
2 Claims. (Cl. 280—47.26)

This invention relates to carts, and more particularly to a utility cart for use in the home and in other locations for transporting and receiving various types of material, such as waste material and rubbish.

A main object of the invention is to provide a novel and improved utility cart or wheeled receptacle which may be employed as a collection container for various materials, such as household rubbish and waste material, the cart being simple in construction, being relatively compact in size, and being provided with means for removably supporting an interior bag or container in an easily accessible position.

A further object of the invention is to provide an improved wheeled receptacle for storing and transporting various materials, such as household waste material, the wheeled receptacle being inexpensive to fabricate, being durable in construction, being neat in appearance, and being relatively light in weight.

A still further object of the invention is to provide an improved wheeled storage container which may be employed as a utility cart for storing and transporting various materials, such as household rubbish, waste, garden debris, and the like, the wheeled cart device being provided with readily accessible handle means enabling the device to be pushed or pulled from either end thereof, as required by its intended use, the device being fabricated from inexpensive but durable materials, having a substantial volumetric capacity, and providing a means for conveniently and safely storing various materials such as rubbish, or the like and for transporting said materials in a safe and convenient manner.

Further objects and advantages of the invention will become apparent from the following description and claims, and from the accompany drawings, wherein:

FIGURE 3 is a longitudinal vertical cross sectional view taken substantially on the line 3—3 of FIGURE 2.

FIGURE 4 is a transverse vertical cross sectional view taken substantially on the line 4—4 of FIGURE 3.

FIGURE 5 is a fragmentary perspective view showing the upper intermediate portion of one of the side walls of the container and illustrating the manner in which a coupling sleeve for connecting the ends of the side arms of the opposing frame bars of the cart is fastened to the side wall of the cart.

FIGURE 6 is an enlarged cross sectional detail view, taken substantially on the line 6—6 of FIGURE 3.

FIGURE 7 is an enlarged cross sectional detail view taken substantially on the line 7—7 of FIGURE 3.

Figure 1:
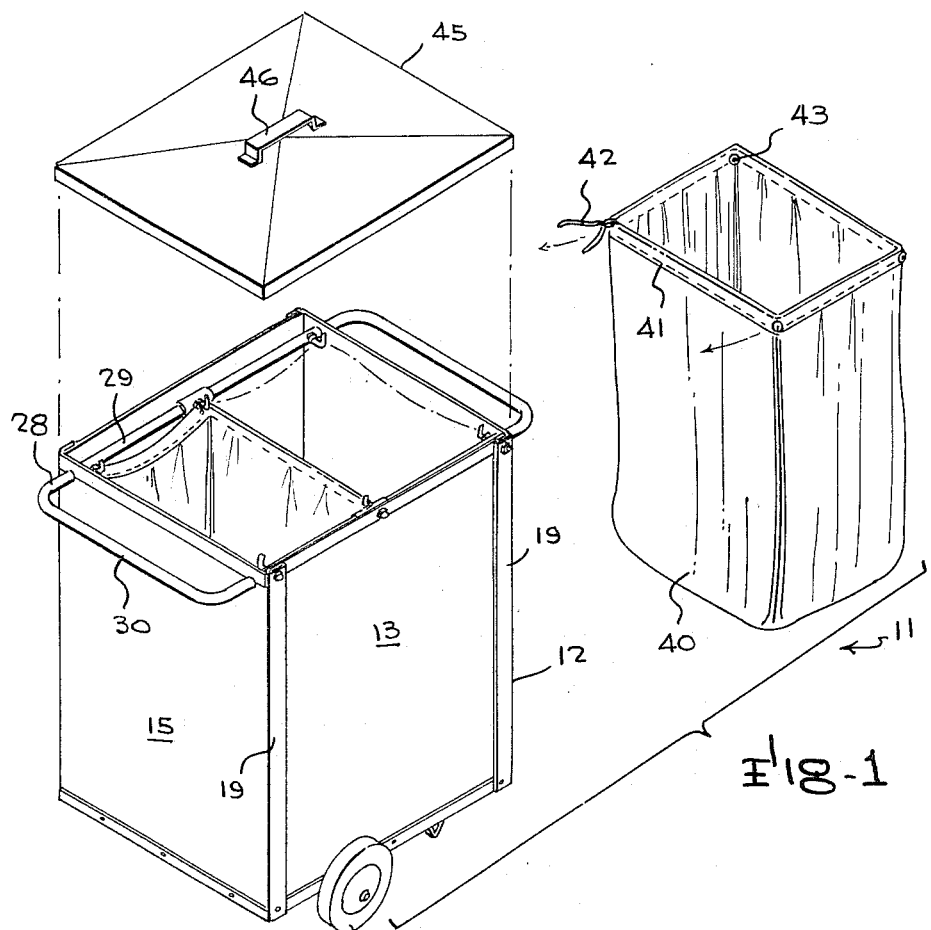
FIGURE 1 is a perspective view of an improved utility cart constructed in accordance with the present invention, shown with one of its inner containers removed and with its top cover in open position.

Referring to the drawings, 11 generally designates an improved household utility cart constructed in accordance with the present invention. The cart 11 comprises a rigid main receptacle 12 made of sheet metal and having vertical side walls 13, 13, vertical front and rear walls 14 and 15, and a horizontal bottom wall 16 which is preferably made of expanded metal, defining the uniformly distributed apertures 17, whereby the interior of the main receptacle 12 is adequately ventilated, since the aperture 17 allows free flow of air into the interior of the receptacle.

The side walls are connected to the front and rear walls in any suitable manner, for example, by crimping their vertical marginal portions together in the manner illustrated in FIGURE 7 at 19, the crimped folds 19 being located at the respective vertical corners of the cart at the front and rear margins of its side walls.

The top marginal portions of the vertical walls of the container are folded over to define reversely bent flange portions 20, thereby providing the container with a reinforced rim. The bottom margins of the vertical walls of the container are likewise folded over, as shown at 21 to provide a reinforcing rim at the bottom of the container, the expanded metal bottom wall 16 being formed with down-turned marginal flanges 22 which are riveted to the folded over bottom rim portion 21, as by conventional rivets 23.

A pair of supporting wheels 24, 24 are journaled to the rear bottom portion of the receptacle 12 on a transverse axis, for example, by being rotatably connected at 25 to the depending arms of respective angle brackets 26 secured to the opposite side portions of bottom wall 16 adjacent to the folded over depending bottom rim portions 21 thereof.

Secured to the bottom wall 16 at opposite sides of its forward portion are respective depending V-shaped supporting brackets 27, 27 which are of sufficient height to cooperate with the supporting wheels 24 to maintain the bottom wall 16 in a substantially horizontal position when the brackets 27 engage the ground, as shown in FIGURE 3.

Figure 2:
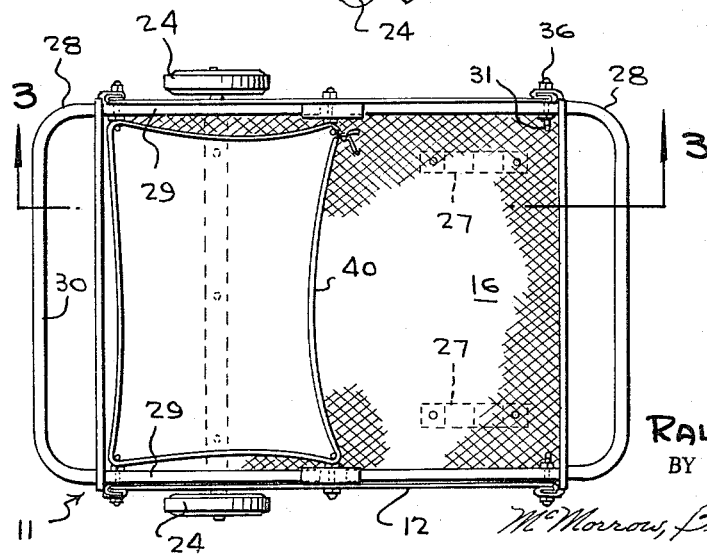
FIGURE 2 is a top plan view of the cart device of FIGURE 1 with its top cover removed.

A pair of longitudinally extending, opposing, generally U-shaped frame bars 28, 28 are disposed horizontally in the top portion of the receptacle, the frame bars having side arms 29, 29 disposed inwardly adjacent to the top marginal portions of the side walls 13, 13 and extending through the top marginal portions of the front and rear walls, said frame bars having transverse bight portions 30 serving as handles and being spaced from and extending parallel to the top marginal portions of the front and rear walls, as will be seen from FIGURE 2. The side arms 29, 29 are secured to the corner portions of the receptacle 12 by respective hook bolts 31, and the inner ends of the side arms 29 are received in connecting sleeves 32 which are likewise secured to the top marginal portions of the side walls 13, 13 by similar hook bolts 31. As shown in FIGURE 5, each hook bolt 31 is generally L-shaped, and is provided with a stop nut 33 threaded thereon, the shank portion of the bolt extending through diametrically opposed apertures 34, 34 provided in the intermediate portion of the associated sleeve 32, and through an aperture 35 in the top intermediate portion of a side wall 13, the outer end of the bolt 31 being fastened by being engaged with a cap nut 36 which is tightly screwed on the bolt and cooperates with the stop nut 33 to clamp the sleeve 32 to the inside surface of the associated wall 13. The bolt 31 is thus secured with its inner hook element 37 in a substantially vertical upstanding position.

The bolts 31 at the corner portions of the receptacle are engaged through the side arms 29 and are secured by cap nuts 36 and stop nuts 33 in the same manner as above described in connection with the securement of the coupling sleeve 32.

The inwardly projecting hook bolts 31 thus define means for supporting removable flexible containers, such as the flexible bags 40 illustrated in FIGURE 1. Each bag 40 comprises a main flexible body of suitable durable material, such as moisture-repellant plastic material, or the like, formed with a top hem 41 which contains a drawstring 42, so that the bag may be substantially closed by tightening the drawstring in a conventional manner. The corner portions of the top of the bag, namely, the corner portions at the hem 41 are provided with grommets 43 which are engageable on the hook bolts 31, namely, which are adapted to receive the upstanding hook elements 37 thereof, in the manner illustrated in FIGURE 1, whereby the receptacles 40 may be supported in the main container 12 in open positions, whereby they can readily receive materials to be collected, such as household rubbish, garden trash, or the like.

The main container 12 is provided with a removable top cover 45 which fits over the top rim of the container, the cover having a handle 46 at its center portion.

As will be readily apparent, the device 11 serves as an easily movable receptacle for trash, household rubbish, or similar materials, being movable readily by means of the handles defined at its opposite ends by the transversely extending bight element 30 of frame bars 28.

The inner containers 40 are removably supported on the hook bolts 31 and can be easily removed from the main container 12 and replaced therein, as required.

While a specific embodiment of an improved utility cart has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A cart comprising a rigid main receptacle made of sheet metal and having vertical side, front and rear walls and a horizontal bottom wall, a pair of supporting wheels journaled to the rear bottom portion of the receptacle on a transverse axis, depending ground-engaging support means secured to the forward portion of said bottom wall and being of sufficient height to cooperate with said wheels to support said bottom wall in a substantially horizontal position, a pair of generally U-shaped frame bars disposed horizontally in the top portion of the receptacle, said frame bars having side arms disposed inwardly adjacent to and being secured to the top marginal portions of said side walls and extending through the top marginal portions of the front and rear walls, said frame bars having transverse bight portions serving as handles and being spaced from and extending parallel to said top marginal portions of the front and rear walls, coupling sleeves inwardly of and adjacent the top intermediate portions of the sidewalls receiving the inner ends of said side arms, and fastening means securing the sleeves and side arms to the top marginal portions of the sidewalls.

2. A cart comprising a rigid main receptacle made of sheet metal and having vertical side, front and rear walls and a horizontal bottom wall, a pair of supporting wheels journaled to the rear bottom portions of the receptacle on a transverse axis, depending ground-engaging support means secured to the forward portion of said bottom wall and being of sufficient height to cooperate with said wheels to support said bottom wall in a substantially horizontal position, a pair of generally U-shaped frame bars disposed horizontally at the top portion of the receptacle, said frame bars having side arms disposed inwardly adjacent to the top marginal portions of said side walls and extending through the top marginal portions of the front and rear walls, said frame bars having transverse bight portions serving as handles and being spaced from and extending parallel to said top marginal portions of the front and rear walls, coupling sleeves inwardly adjacent the top intermediate portions of the side walls, receiving the inner ends of said side arms, and fastening bolts extending through the side arms and the coupling sleeves and through the top marginal portions of said side walls, securing the side arms to said top marginal portions, said fastening bolts having hook-shaped inner ends for removably supporting inner containers in said main receptacle.

References Cited by the Examiner

UNITED STATES PATENTS

| | | | |
|---|---|---|---|
| 1,427,388 | 8/1922 | Holley | 280—79.2 |
| 1,758,144 | 5/1930 | Caselman | 280—79.2 X |
| 2,525,208 | 10/1950 | Clink. | |
| 2,689,745 | 9/1954 | Rosenberry | 280—47.26 |
| 2,918,299 | 12/1959 | Lambert | 280—47.37 X |
| 2,981,549 | 4/1961 | Holton | 280—47.35 |

BENJAMIN HERSH, *Primary Examiner.*